3,179,317
METHOD AND APPARATUS FOR SPLITTING PLASTIC FOAM
Walter D. Voelker, Philadelphia, Pa., assignor, by mesne assignments, to Allied Chemical Corporation, New York, N.Y., a corporation of New York
Filed May 25, 1962, Ser. No. 197,644
7 Claims. (Cl. 225—4)

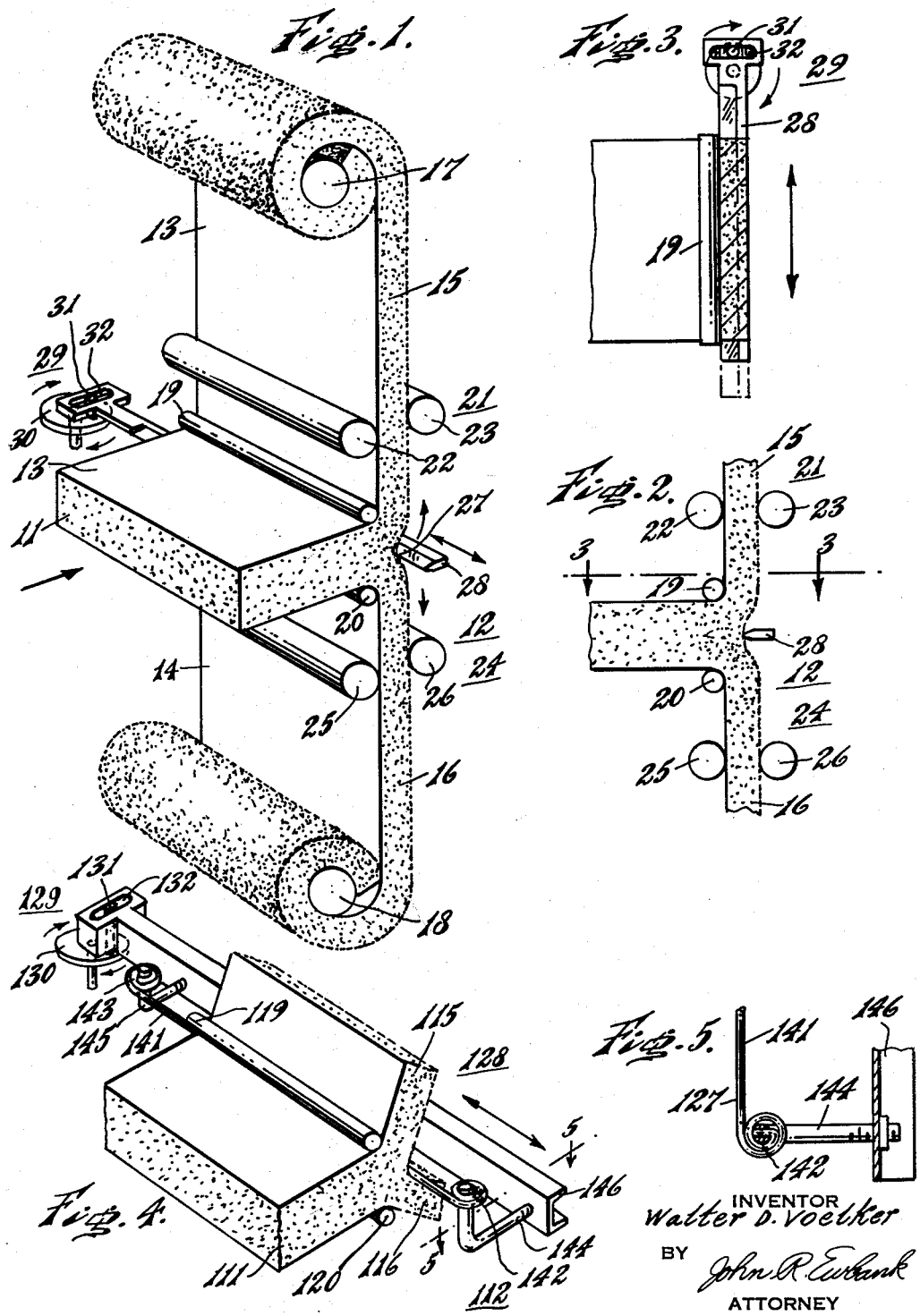

This invention relates to method and apparatus for splitting plastic foam, and is particularly concerned with continuous, high-speed production of strips of split polyurethane foam by splitting thick strips into two thinner strips.

A variety of industrial machines have been employed heretofore to produce split plastic foam by splitting a thick strip into two thinner strips. The technology of splitting plastic foam has generally been associated with expensive equipment comprising band saws or band blades. Some of the limitations affecting machines for the production of strips of plastic foam have been imposed by the limitations incident to band knives associated therewith. A band knife splitting an advancing plastic foam strip has functioned well at slow speeds of advancing foam, but a variety of problems have arisen in connection with higher speeds of forward travel of the advancing foam.

In accordance with the present invention, a thick strip of plastic foam is split into two strips of thinner plastic foam by the application of a combination of the action of a knife-edge and the tearing action brought about by the control not only of the tension but also of the angle at which the two thinner strips of plastic foam are withdrawn from the splitting zone. The invention has particular value in connection with polyurethane foam.

The nature of the invention is further clarified by the accompanying drawings in which FIG. 1 is a schematic view of one embodiment of the invention. FIG. 2 is a sectional view of a portion of FIG. 1. FIG. 3 is a top sectional view of a portion of the apparatus of FIG. 2, taken on the line 3—3. FIG. 4 is a schematic view of a portion of an alternative embodiment. FIG. 5 is a top sectional view taken on line 5—5 of FIG. 4.

Referring now in detail to the method and apparatus of FIGS. 1, 2, and 3, a thick strip of plastic foam 11 advances toward a splitting zone 12. The thick strip 11 has an upper face 13 and a lower face 14, one or both of which faces may be a facing sheet of a relatively unstretchable material. The relationships of the components are conveniently described in geometric terms, noting the angle between intersecting planes. The advancing strip of thick plastic foam 11 moves along a linear path in a plane which is shown as a horizontal plane in FIGS. 1–3. From the splitting zone 12, there are withdrawn an upper strip 15 and a lower strip 16. Facing sheets on faces 13 and 14 are bonded to strips 15 and 16 respectively. The linear path of withdrawal of the strip 15 is in a plane forming an angle with the plane of the thick strip 11. Similarly, the linear path of withdrawal of the strip 16 is in a plane forming an angle with the plane of the thick strip 11. As shown in FIGS. 1–3, the withdrawal paths may be substantially vertical, so that the angle between the plane of the thick strip 11 and each of the strips 15 and 16 is substantially 90°, and so that the angle between the planes of the two withdrawal paths is substantially 180°. The split product 15 is reeled onto a suitable collecting means 17. Similarly, the split product 16 is reeled onto collecting means 18. In entering the withdrawal path, the face 13 is guided around a portion of roller 19, similar to roller 20, which guides face 14 towards its withdrawal path.

Particular attention is directed to tensioning means 21 comprising rollers 22 and 23 and adapted to pinch and pull the split product from the splitting zone 12. Similarly, a tensioning means 24 includes a pair of rollers 25 and 26 adapted to pinch and pull the split product downwardly from the splitting zone 12. The tension may be controlled by driving the rollers of the tensioning means at a speed corresponding to a speed faster than the advancing of the thick member 11 and by interposing a suitable slipping clutch between such driving means and the tensioning rollers.

There is a tendency for the plastic foam to be torn apart because the tensioning means 21 and 24 are pulling the split products at diverging angles, shown in FIGS. 1–3 as 180° apart. The ease with which a plastic foam is torn apart depends in part upon the size of the gas cell, foam density, average thickness of the wall of the gas cell, and other factors. Some of the sponge rubbers of the prior art have had a significantly high tensile strength, attributable in part to the combination of high elasticity and relatively thick cell walls. Some polyurethane foams have very low density, very small gas cells, and very thin cell walls of quite restricted elasticity, and can be torn readily after a tear has been started. This characteristic of low density polyurethane foam has generally been treated as a disadvantage to be mentioned only rarely, but is the remarkable characteristic of polyurethane foam exploited in this invention. Other plastic foams having thin walled cells of relatively small tenacity can also benefit from the present invention. In the development of the present invention, it was discovered that the susceptibility of plastic foams to tearing is dependent in part upon the speed of tearing, and that the action of a rapid machine attained more consistent tearing of low density flexible polyurethane foam than had been observed in tearing tests by hand.

The splitting zone 12 includes a knife-edge 27 providing a cutting action which cooperates with the tearing action induced by the withdrawal means. It should be especially noted that the splitting method of the present invention employs a combination of cutting action and tearing action, each of sufficient magnitude to cooperate with the other, but neither sufficient to accomplish the splitting by itself. The speed of advancing of the thick strip 11 is sufficiently great that the splitting could not be accomplished satisfactorily by the knife-edge alone or by the tearing action alone, but the combination of the forces permits the continuous splitting of the plastic foam.

Any cutting edge is dulled by prolonged operation, and in some of the prior art methods of splitting plastic foam, it was necessary to provide expensive and cumbersome means for sharpening the knife-edge employed to cut the foam. By greatly reducing the importance of the cutting action, the present invention also reduces the importance of the sharpness of the knife-edge, whereby significantly simpler knife-edges may be employed. The knife-edge may retain adequate sharpness during production runs of normal duration, so that resharpened replacement blades may be substituted during the periods when the splitting machine is shut down for other reasons. If desired, the knife-edge may have a sidewise motion such as a linear oscillation. As shown in FIGS. 1–3, a knife 28 having the knife-edge 27 is reciprocated by reciprocating means 29 including a rotating disc 30 having a pin 31 sliding in a slot 32 of the knife 28.

In the embodiment of the invention shown in FIGS. 4 and 5, a knife-edge 127 is provided by a wire 141 of a knife 128, which is reciprocated by reciprocating means 129 comprising a rotating disc 130 actuating a pin 131 positioned in a slot 132 of knife 128. The wire 141 is maintained under tension by tensioning means 142 and 143, which are mounted on pins 144 and 145 respectively, each secured to a beam 146. The thick plastic foam strip 111 can advance toward the knife-edge 127, and is there split apart into plastic foam strips 115 and 116 by reason of the combination of tension and diverging angle of the withdrawal paths. The reciprocating knife 128 cooperates with such tendency toward tearing to bring about the splitting of the thick strip 111. Some substantially rigid polyurethane plastic foams can be split when the angle between the two diverging withdrawal paths is relatively small. Unless the cell walls are especially thick or elastic, the flexible polyurethane foam strips may be split by this combination action when the angle of divergence is significantly less than 180°. The greater the elasticity of the composition and the less the brittleness of the foam, the greater is the need for a larger angle of divergence of the withdrawal paths.

The method of splitting includes the steps of: advancing a thick strip of plastic foam along a linear path having a plane; directing said thick strip of plastic foam against a knife-edge in said plane and perpendicular to the path of the thick strip; withdrawing two strips of plastic foam along withdrawal paths having diverging planes; exerting a tearing force upon the plastic foam at the knife-edge by maintaining a significant angle between the diverging planes of the strips of plastic foam being withdrawn and by maintaining a significant tension upon each of the strips being withdrawn; and controlling the speed of the advancing thick member so that it exceeds the speed at which satisfactory splitting could be accomplished by either the knife-edge or the tearing action, but within the range of speeds at which satisfactory splitting is accomplished by the combination of the tearing action and the action of the knife-edge.

The splitting machine includes: means for advancing a thick strip of plastic foam toward a splitting zone; means for withdrawing two thinner strips of plastic foam from the splitting zone at diverging angles; means for applying tension to each of the thinner strips, which tension applied along the diverging paths tends to tear apart the plastic foam; a knife cooperating with the tearing tendency to split the thick strip of plastic foam; and collecting means for each of the thinner strips of plastic foam.

The machine should provide for a close positioning of the knife-edge and the two tensioning means for the strips being withdrawn, inasmuch as numerous difficulties can arise when an excessive distance separates the pulling devices from the knife-edge. Ordinarily each of the two tension devices is within approximately one foot of the knife, and the time required for a point on a thin strip to travel from the knife-edge to the tensioning means is less than one second.

Various modifications of the method and machine are possible without departing from the subject matter set forth in the appended claims.

The invention claimed is:

1. A method of splitting a sheet of plastic foam material into two sheets of lesser thickness which comprises directing a first sheet of plastic foam material against a knife-edge that provides a cutting action along a plane substantially parallel to the planes defining the faces of said first sheet and withdrawing two sheets of lesser thickness than said first sheet along withdrawal paths diverging from the plane of said cutting action by application of a tension force to each of said two sheets whereby a tearing action is produced, said tearing action functioning in cooperation with said cutting action to split said first sheet of plastic foam material.

2. The method of claim 1 wherein the plastic foam material is polyurethane foam.

3. The method of claim 1 wherein each of the planes defining the said withdrawal paths form substantially the same angle with the plane of the cutting action.

4. The method of claim 1 wherein the plastic foam material is flexible polyurethane foam and the enclosed angle between the planes defining the said withdrawal paths is at least about 90 degrees.

5. The method of claim 1 wherein the said sheet of plastic foam material is a sandwich structure comprising a plastic foam core with facing sheets adhered thereto.

6. The method of claim 1 wherein the tension force is applied to each of the said two sheets by a pair of rollers in frictional contact therewith which are operated at a speed exceeding that at which the said sheet of plastic foam material is advanced against the said knife-edge.

7. Apparatus for splitting sheets of plastic foam material at high rates which comprises: means for directing a sheet of plastic foam material into a splitting zone; a knife in said splitting zone constructed and arranged to impart a cutting action to said sheet of plastic foam material along a plane substantially parallel to the planes defining the faces of the said sheet of plastic foam material; means for withdrawing two sheets of lesser thickness than said sheet of plastic foam material from said splitting zone along withdrawal paths diverging from the plane of said cutting action; means for applying tension to each of the said two sheets whereby a tearing action functioning in cooperation with the said cutting action to split the said sheet of plastic foam material is produced; and means for collecting each of the said two sheets.

References Cited by the Examiner
UNITED STATES PATENTS

| | | | |
|---|---|---|---|
| 2,219,755 | 10/40 | Skold | 83—4 |
| 2,258,428 | 10/41 | Stalder | 225—99 X |
| 2,841,205 | 7/58 | Bird | 156—254 X |
| 3,109,339 | 11/63 | Braun et al. | 83—4 |

ANDREW R. JUHASZ, *Primary Examiner.*

WILLIAM W. DYER, JR., *Examiner.*